United States Patent [19]

Moldenhauer et al.

[11] 4,273,154
[45] Jun. 16, 1981

[54] DEVICE FOR REGULATING THE VACUUM IN A VACUUM LINE SYSTEM, ESPECIALLY FOR MILKING INSTALLATIONS

[75] Inventors: Hermann Moldenhauer; Kurt Muller, both of Dusseldorf, Fed. Rep. of Germany

[73] Assignee: A. und K. Muller GmbH & Co. KG, Dusseldorf, Fed. Rep. of Germany

[21] Appl. No.: 118,874

[22] Filed: Feb. 6, 1980

[30] Foreign Application Priority Data

Feb. 12, 1979 [DE] Fed. Rep. of Germany ....... 2905199

[51] Int. Cl.³ ............................................ F16K 31/126
[52] U.S. Cl. .................................. 137/490; 119/14.44; 137/489.5; 137/491
[58] Field of Search ..................... 119/14.44; 137/526, 137/506, 490, 491, 489.5

[56] References Cited

U.S. PATENT DOCUMENTS

| | | | |
|---|---|---|---|
| 2,667,856 | 2/1954 | Heckendorf | 119/14.44 |
| 3,811,467 | 5/1974 | Jones | 137/494 |

Primary Examiner—Hugh R. Chamblee
Attorney, Agent, or Firm—Sprung, Felfe, Horn, Lynch & Kramer

[57] ABSTRACT

A device for regulating the vacuum in milking installations has a main valve and an auxiliary valve. A main valve chamber is connected with the atmosphere and, through a valve seat to the vacuum line. A control chamber is closed off from the main valve chamber by a first membrane and from the atmosphere by a second membrane. Both membranes are joined to a movable support bearing the main valve body, which presents active surfaces of different size to the main valve chamber and to the atmosphere. The position of the main valve is dependent upon the pressure in the control chamber, which pressure is determined by the auxiliary valve which is disposed in the support. The auxiliary valve has two auxiliary chambers separated by an auxiliary membrane to which the auxiliary valve body is fastened. The first auxiliary chamber is connected to the vacuum line and the second auxiliary chamber is connected to the atmosphere. The position of the auxiliary valve is dependent upon the pressure difference in the auxiliary chambers and the force of an adjustable spring acting on the auxiliary valve body. The control chamber and first auxiliary chamber are connected to the vacuum line by a passage disposed centrally thereof.

10 Claims, 4 Drawing Figures

DEVICE FOR REGULATING THE VACUUM IN A VACUUM LINE SYSTEM, ESPECIALLY FOR MILKING INSTALLATIONS

BACKGROUND OF THE INVENTION

The subject matter of the invention is a device for controlling the vacuum in a vacuum line system, especially for milking installations.

A device of this kind is known, having a casing which can be attached to a vacuum line by means of a pipe connection, and in which there is disposed a main valve means comprising a main valve chamber having a valve seat on its side facing the pipe connection and air inlet apertures in its outer walls, and having a main valve connected by a stem to a membrane by which the main valve chamber is separated from a control chamber. A vacuum which depends on the vacuum prevailing in the vacuum line can be applied to the control chamber, the position of the main valve with respect to its seat being dependent upon the vacuum in the control chamber. In the casing there is disposed an auxiliary valve means influencing the vacuum in the control chamber, and having an auxiliary valve which is connected to an auxiliary membrane separating two auxiliary chambers, a first of which is connected to the vacuum line and a second to the exterior, the pressure difference thus created producing a force lifting the auxiliary valve away from an auxiliary valve seat against the adjustable force of a coil spring.

A device of this kind is described, for example, in German Auslegeschrift No. 2,363,125.

Such devices are intended for the purpose of maintaining a certain given pressure constant in vacuum line systems, and especially to keep it from decreasing. This is very important especially in milking installations. The use of the device of the invention, however, is not limited to milking installations, and can also be used for the control of vacuum in any kind of vacuum line system.

The known device has the disadvantage that the closing force applied to the main valve is determined in part by a loading weight, so that the operation of the device depends to a great extent on the position in which it is installed. In another embodiment of the known device, the main valve closing force is determined in part by a coil spring, so that the opening and closing action of the main valve is greatly dependent upon the characteristic and bias of this coil spring, so that, in the case of a linear characteristic, for example, the forces required for opening increase greatly as the opening travel increases. This had a disadvantageous effect on the regulating action of the device. Furthermore, in the known device the transmission of the reference vacuum to the first auxiliary chamber of the auxiliary valve takes place through an independent conduit running outside of the device and leading into the vacuum line at a point different from the point at which the device is connected to the vacuum line. In the first place, therefore, two places must be provided for connecting the device to the vacuum line, and secondly the reference vacuum is taken from the vacuum line at a point whose distance from the point at which the regulation takes place is not negligible under certain circumstances, and this can also result in disturbances in the regulation.

SUMMARY OF THE INVENTION

The object of the invention is to improve the device of the type mentioned in the beginning such that it would be independent of its position, i.e., that it could be connected to a vacuum line in any position. Furthermore, the device is to be of compact construction, and especially it is to be able to be connected to a point on a vacuum line with only a single connection.

The object of the invention are achieved by closing off the control chamber on the side facing away from the main valve chamber with a second membrane adjoining the exterior, both membranes being attached to the casing on the one hand and on the other to a movable valve support on which the stem of the main valve is disposed, and by presenting active surfaces of different size, one to the interior of the main valve chamber and the other to the exterior, the auxiliary valve being disposed on the valve support, and the control chamber as well as the first auxiliary chamber being connected to the vacuum line by a passage running through the support, the valve stem and the main valve.

By the disposition of the control chamber between the two membranes attached to the movable support, the main valve is made to act in the manner of a differential piston. Each pressure difference between the exterior and the control chamber corresponds to a certain particular position of the main valve, and there is no need for any additional measures, such as spring loading or loading by weights, to cause the main valve to close. By the special disposition of the auxiliary valve and the delivery of the vacuum through the main valve it is brought about that no additional external connection is required for the reference vacuum.

In accordance with the invention, a variety of advantageous embodiments of the device of the invention is possible.

For example, a tube can be disposed concentrically in the passage on a portion of its length, and its outside diameter can be smaller than the inside diameter of the passage, such that a first annular passage is created between the inside wall of the passage and the outside wall of the tube, thereby providing the connection between the control chamber and the vacuum line, and the tube is carried through the auxiliary valve seat while leaving a second annular passage, and through the auxiliary valve, sealingly and fixedly joined to the latter, and is connected to the first auxiliary chamber.

In an especially advantageous embodiment, the passage can be prolonged at the end adjacent the vacuum line by means of a flexible tube passing through the connection piece into the vacuum line.

In another advantageous embodiment, the tube is carried through the entire length of the passage and is prolonged at its end adjacent the vacuum line by a flexible tube passing through the connection piece into the vacuum line.

In these two last-named embodiments it is brought about that the reference vacuum delivered to the auxiliary valve acting as a comparator is detected not in the connection itself but in the vacuum line, at a point where the turbulence has died out.

In still another especially advantageous embodiment, the control chamber is connected to the vacuum line by a fixed throttle means and can be connected by the auxiliary valve to the second auxiliary chamber in the form of a valve chamber, and the main valve is disposed with respect to its valve seat such that, when the pressure increases in the control chamber, a force is exerted on the main valve which tends to open it.

By this embodiment a device is created in accordance with the invention, in which, as will be explained more extensively below with the aid of an embodiment, the pressure in the control chamber of the main valve is controlled oppositely to the pressure in the vacuum line, i.e., when the pressure in the vacuum line further decreases, i.e., when the vacuum becomes higher, the pressure in the control chamber increases and thereby opens the main valve and the pressure in the vacuum line increases again. In systems in which an excessively great drop in the pressure in the vacuum line must be prevented under all circumstances, as in the case of milking installations, for example, this has the great advantage that the device is a "fail-safe" device, i.e., if the pressure is caused to increase in the control chamber by trouble in the valve itself, such as a break in the membrane, especially when it increases up to the atmospheric pressure, the valve will open. This feature is not to be found in known devices of this kind.

Furthermore, this embodiment has the great advantage that the device can use very low air flow rates for the regulation, so that a far better utilization of the maximum pumping power becomes possible.

The construction of the membranes as oppositely acting rolling membranes, known in themselves, has the advantage that no skewing of the device in one or another direction can take place.

BRIEF DESCRIPTION OF THE DRAWINGS

Examples of the embodiments of the device of the invention will be further explained below with the aid of the appended drawings, wherein.

DETAILED DESCRIPTION OF THE INVENTION

Figure 1:
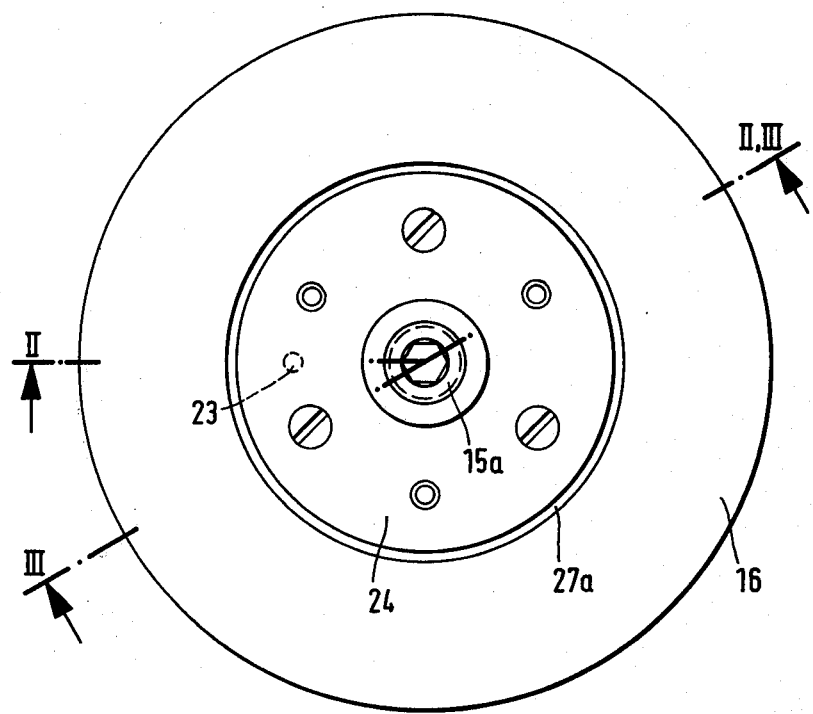
FIG. 1 is a top view of a device for the regulation of the vacuum in a vacuum line system.
Figure 2:
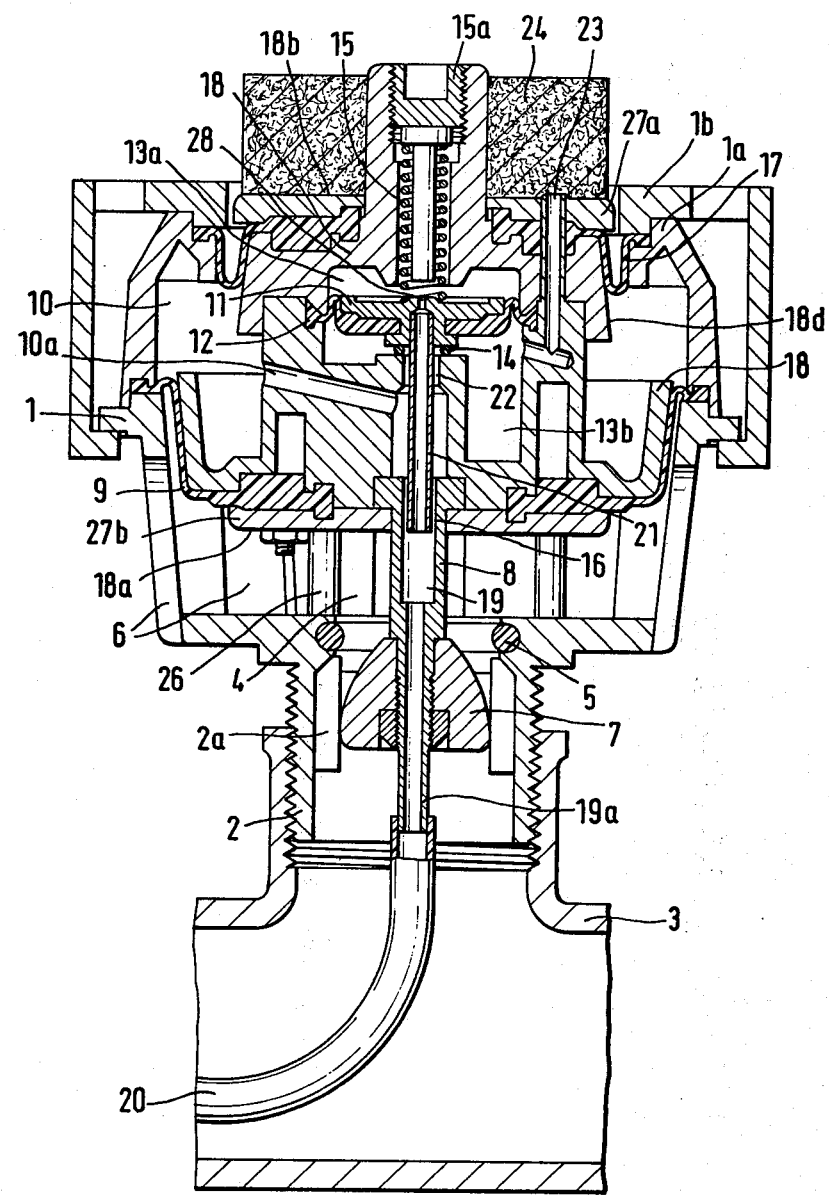
FIG. 2 is a cross section taken along line II—II of FIG. 1, with the main valve open.
Figure 3:
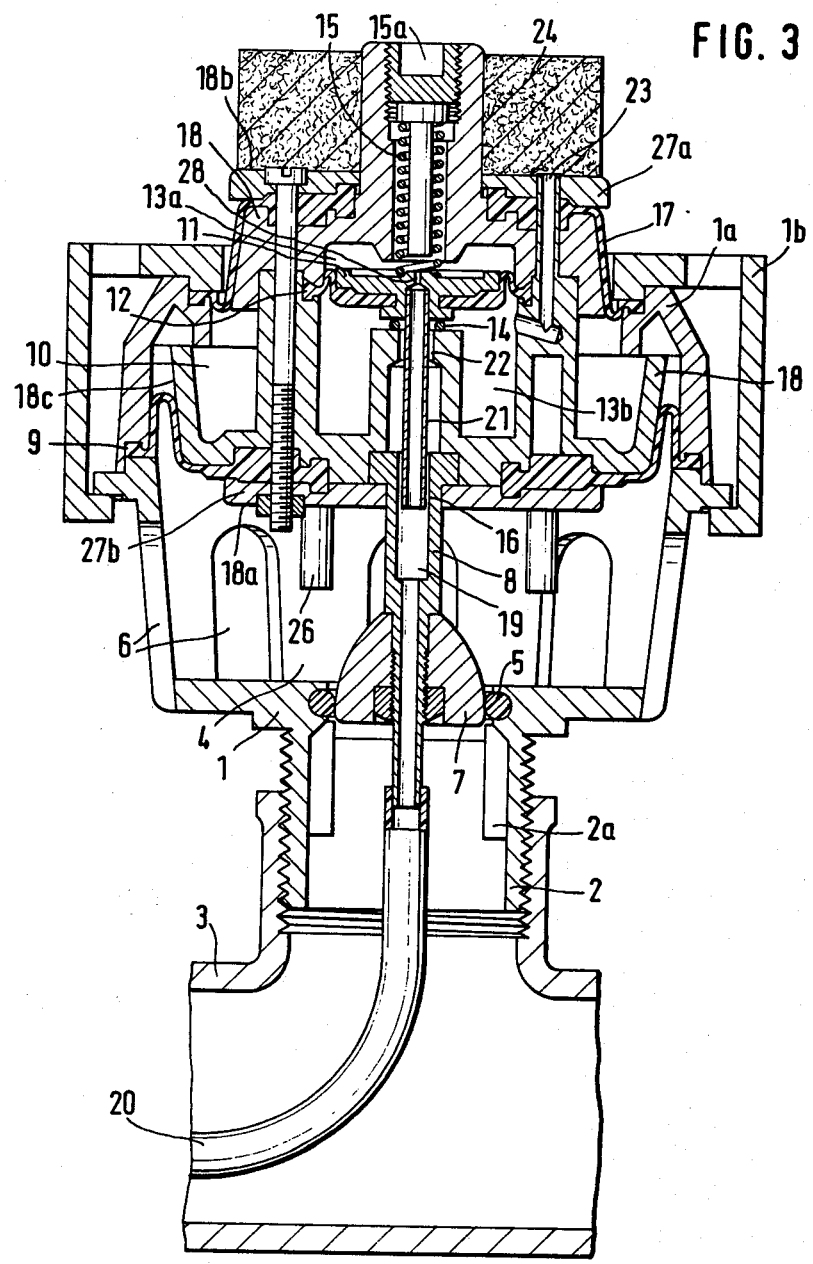
FIG. 3 is a cross section taken along line III—III of FIG. 1, with the main valve closed.

The apparatus represented in FIGS. 1 to 3 has a casing 1 having a connection 2 whereby it is connected to a vacuum line 3 represented only partially in the drawings. Within the casing 1 there is disposed a main valve whose seat is at the transition between the casing 1 and the connection 2. The valve seat has an O-ring 5 which can be engaged by a main valve body 7 disposed on the side of the valve seat facing the connection 2. The valve stem 8 is brought through the valve seat 5 and is attached to a valve support 18 which is movably disposed in casing 1 and has active surfaces 18a and 18b. The inner chamber of casing 1 adjoining the connection 2 forms the main valve chamber 4 which is vented to the exterior through the air admission apertures 6. The valve support 18 is connected by a first rolling membrane 9 to the casing 1 and by a second rolling membrane 17 to a sealing ring 1a forming the upper part of the casing and mounted thereon. The sealing ring 1a is affixed to the casing 1 by means of an annular clamp 1b. The valve support 18 is movable in the axial direction, such that the rolling membranes 9 and 17 will roll against the guiding surfaces 18c and 18d. Between the two rolling membranes 9 and 17 there is a control chamber 10 which is sealed by the sealing ring 1a. The control chamber 10 is connected by a passage 10a to a passage 19 running through the valve support 18, the valve stem 8 and the main valve body 7 and emerging at the side of the main valve body 7 facing the vacuum line 3, where it terminates in an extension tube 19a. The extension tube 19a is inserted into a flexible tube 20 which passes through the connection 2 and into the vacuum line 3.

Within the valve support 18 of bipartite construction there is provided a chamber in which an auxiliary valve 11 is disposed, which is attached by a rolling membrane 12 to the valve support 18. The rolling membrane 12 divides the chamber in which the auxiliary valve 11 is disposed into a first auxiliary chamber 13a and a second auxiliary chamber 13b. The valve 11 is movable axially and cooperates with an auxiliary valve seat 14 which is in the form of an O-ring and is so disposed on the upper end of passage 19 within the valve support 18 that the upper end of passage 19 can be closed by means of the auxiliary valve 11. A tube 21 extends axially downward through the auxiliary valve 11 and through valve seat 14 into passage 19, and at its upper end it communicates through an orifice 28 with the first auxiliary chamber 13a. The diameter of this tube and its length are such that within the passage 19 two passages of annular cross section are formed, namely a first passage 16 between the main valve 7 and the entrance of connecting passage 10a into passage 19, and a second passage 22 of annular cross section between the valve seat 14 and the entry of connecting passage 10a into passage 19. The cross-sectional area of the first annular passage 16 is smaller than the cross-sectional area of the second annular passage 22.

The second auxiliary chamber 13b, which forms the valve chamber of the auxiliary valve, communicates with the exterior through an air intake passage 23, the inlet orifice of passage 23 being covered by a filter 24. The auxiliary valve 11 is urged against the valve seat 14 by a coil spring 15 disposed in the valve support 18. The bias of the coil spring 15 is variable by means of an adjusting screw 15a.

The rolling membranes 9 and 18 are clamped to the valve support 18 by means of the bolted plates 27a and 27b. On the side of valve support 18 facing the main valve chamber 4, there are also disposed the posts 26 which limit the travel of the main valve upon full opening. Guide tracks 2a are provided in nipple 2 to guide the main valve 7.

The operation of the above-described apparatus is as follows:

A vacuum is produced in vacuum line 3 by a pump which is not shown. When the pressure drops in vacuum line 3, the pressure within the control chamber 10 is also lowered through the flexible tube 20, the passage 19 and the connecting passage 10a. In like manner, the pressure in the first auxiliary chamber 13a is lowered through the flexible tube 20, passage 19, tube 21, and orifice 28. Due to the bias of the spring 15, however, at first the auxiliary valve 11 remains seated on auxiliary valve seat 14, i.e., the auxiliary valve remains closed. As a result of the vacuum in control chamber 10, the atmospheric pressure acts on the two active surfaces 18a and 18b of the valve support 18. Since the lower active surface 18a is larger than the upper active surface 18b, a force develops which ultimately brings the valve support 18 from the position shown in FIG. 2 to the position shown in FIG. 3. At the same time the main valve body 7 applies itself to the main valve seat 5 and the main valve is thus closed.

When the pressure in vacuum line 3 continues to drop and thus also the pressure in the first auxiliary chamber 13a diminishes more slowly through the orifice 28, inasmuch an atmospheric pressure prevails in the second auxiliary chamber 13b, the opening force acting on auxiliary valve 11 against the force of coil spring 15 becomes greater. When this opening force overcomes the force of the coil spring 15, the auxiliary valve 11 is lifted from auxiliary valve seat 14. Outside air can then enter into passage 19 through the intake passage 23 and the second auxiliary chamber 13b as well as the passage 22, to a certain degree. This causes the pressure in control chamber 10 to increase, and a force acts on the valve support 18 tending to open the valve, thereby lifting the main valve body 7 from the main valve seat 5 to a greater or lesser extent, depending on the pressure prevailing in the control chamber 10. As a result, the outside air passes through the air entrance apertures 6 into the main valve chamber 4 and through the connection 2 into the vacuum line, with the result that the pressure in vacuum line 3 again increases.

This operation therefore results in a regulation of the vacuum in vacuum line 3, it being possible to adjust the steady vacuum level by means of screw 15a to vary the bias of the coil spring 15.

By means of the auxiliary valve, the pressure prevailing in control chamber 10 is controlled in the above described device by the admixture of additional air. The lower the pressure in vacuum line 3 becomes, the more the auxiliary valve 11 rises from the auxiliary valve seat 14, and the more additional air is fed to passage 19 and hence to control chamber 10, i.e., the more the pressure in vacuum line 3 drops, the more the pressure increases in the control chamber 10. The regulating characteristic of the entire apparatus can be governed by appropriately dimensioning the internal cross sectional areas of the two passages 16 and 22 and of the orifice 28. At the same time, the internal cross sectional area of passage 16 must be smaller than that of the passage 22, so that no more additional air can be carried out of the passage 19 than is being fed in through the auxiliary valve. The orifice 28 produces a slightly delayed response of the auxiliary valve, thereby permitting the elimination of valve chatter.

One special property of the device described is its ability to "fail safe." This "fail-safe" quality is to be understood to mean that, in the event of trouble occurring in the device itself, the main valve will assume a certain desired position. This position, in the case of a milking installation, is the open position, because in this case the pressure in vacuum line 3 increases, which means that in no case can an unacceptably great drop of the pressure in the vacuum line 3 occur which might damage the udders of the cows. If, for example, in the case of the apparatus of FIGS. 1 to 3, one of the two rolling membranes 9 or 17 develops a leak or bursts, the pressure in the control chamber 10 will increase, possibly up to atmospheric pressure, and the result will be that main valve will reliably open.

Another property of the apparatus is that, due to the movement of tube 21 together with the auxiliary valve 11, a self-clearing action will be produced in passages 16 and 22, to protect them against clogging.

The prolongation of the passage 19 by the flexible tube 20 brings it about that the reference pressure which is fed to the first auxiliary chamber 13a is detected not within the connection 2 where turbulence might occur, but within the vacuum line 3.

The manner of the operation of the rolling membranes 9 and 17 assures that there can be no skewing in the movement of the valve support 18, and particularly no "slip-stick" action. The operation of the entire device is independent of the position of installation.

Figure 4:
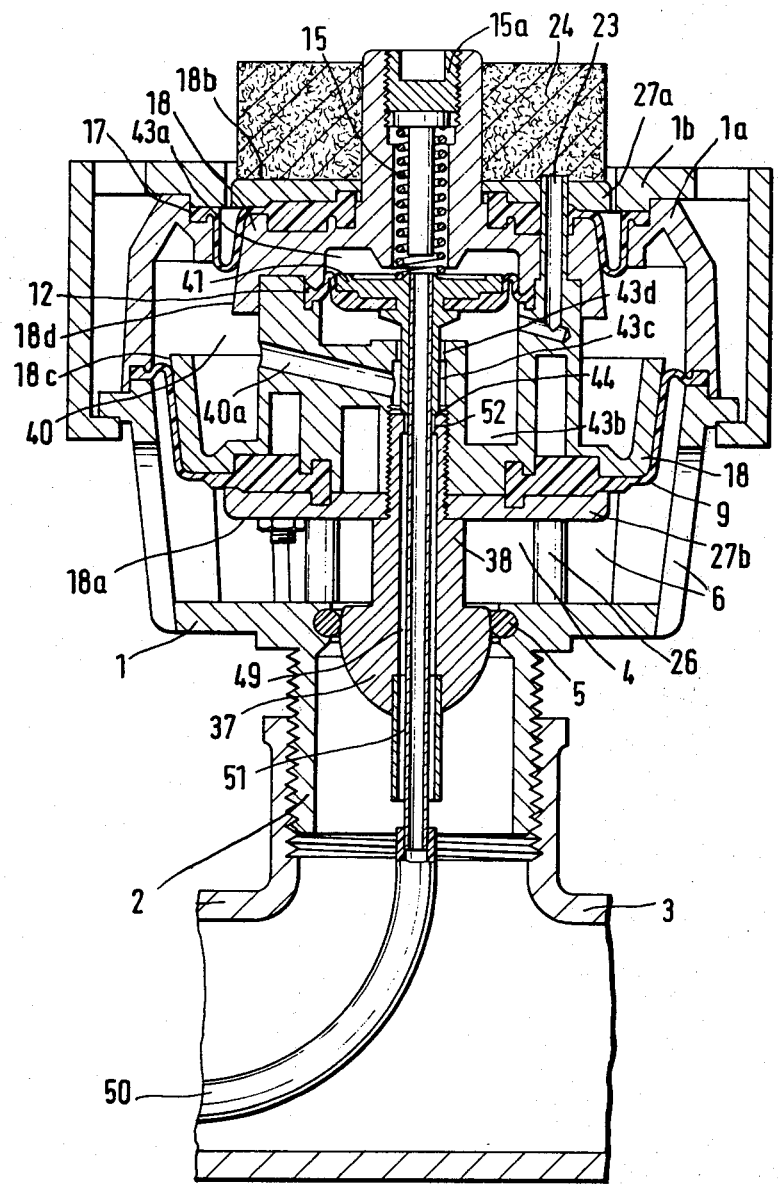
FIG. 4 is a cross section taken along line II—II of FIG. 1 in another embodiment of the device, with the main valve closed.

Another embodiment of a vacuum regulating device is represented in FIG. 4, which is basically similar to the device of FIGS. 1 to 3. Therefore the same reference numbers are used in FIG. 4 for the same parts as those in FIGS. 1 to 3.

The device represented in FIG. 4 differs in its operation from the device of FIGS. 1 to 3 primarily in that the control of the pressure in the control chamber of the main valve takes place in the same sense as the pressure change in the vacuum line 3.

First the structural differences from the embodiment shown in FIGS. 1 to 3 will be described. The main valve 37, when open, is within the valve chamber 4 on the side of the main valve seat 5 that faces away from the connection 2. The main valve body 37 is attached to valve support 18 by its stem 38. The control chamber 40 separated by the two rolling membranes 9 and 17 from the main valve chamber 4 and the exterior, respectively, is connected by a connecting passage 40a to a valve chamber 43c disposed within the valve support 18. The valve chamber 43c is in turn connected by the auxiliary valve seat 44, which can be closed by the auxiliary valve 41, and by an annular passage 52 to a passage 49 which is carried through the valve stem 38 and the main valve 37 and terminates in the connection 2. The auxiliary valve chamber 43c is furthermore connected by an annular passage 43d to the second auxiliary chamber 43b, which in turn is connected to the exterior through the inlet passage 23 and the air filter 24. The auxiliary valve 41 is joined by the rolling membrane 12 to the valve support 18, the rolling membrane 12 separating from one another the auxiliary chambers 43a and 43b.

The auxiliary chamber 43a is connected directly to the vacuum line 3 by a tube 51 leading directly into it. The tube 51 extends through the auxiliary valve 41, auxiliary valve seat 44 and the entire length of passage 49 through the valve stem 38 and valve body 37, and beyond the end of passage 49, into the vacuum line 3. By means of a flexible tube 50, the tube 51 is prolonged such that the vacuum delivered to the auxiliary chamber 43a is obtained directly in the vacuum line 3.

The operation of the device of FIG. 4 is as follows:

When the pressure in vacuum line 3 drops, a vacuum is produced in the first auxiliary chamber 43a on the basis of which a force acting on the auxiliary valve 41 is produced, which acts against the force of the coil spring 15 by which the auxiliary valve 41 is urged against the auxiliary valve seat 44. Depending on the adjusted bias of the coil spring 15, the auxiliary valve 41 at first does not rise from its seat 44. The control chamber 40 is connected by the connecting passage 40a, the auxiliary valve chamber 43c and passage 43d to the second auxiliary chamber 43b and hence to the exterior through the air intake passage 23, so that, when the auxiliary valve is closed, atmospheric pressure will establish itself in the control chamber 40. In this state the main valve 37 is closed on its seat 5. Then, when the pressure in the vacuum line 3 decreases to the extent that, as a result of the likewise diminishing pressure in the first auxiliary chamber 43a, the auxiliary valve 41 is unseated from valve seat 44 against the force of the coil spring 15, the pressure is also lowered in auxiliary valve chamber 43c through the passage 52 and passage 49, resulting in a lowering of the pressure in the control chamber 40.

Under the action of atmospheric pressure, the valve support 18 is subjected to the action of a force directed upwardly in FIG. 4, in the manner previously described with reference to FIGS. 1 to 3, and the main valve 37 rises from the main valve seat 5. Now the air entering through the air inlet apertures 6 into the main valve chamber 4 will pass through connection 2 into the vacuum line 3 and therefore the pressure will again increase. Thus, again, a regulation is achieved in the vacuum line 3 according to the control bias established by means of the coil spring 15. The regulatory performance of the device is determined by the cross-sectional apertures of the two passages 52 and 43d.

It is also to be noted in the device of FIG. 4 that the reference pressure fed to the first auxiliary chamber 43a is obtained at a different point in the vacuum line 3 than the control vacuum fed to the control chamber 40. In this manner any influencing of the reference vacuum by the regulating action itself is largely excluded.

Of course, it is also possible in the case of the embodiment represented in FIGS. 1 to 3 to obtain the reference vacuum at a different point than the control vacuum fed to the control chamber 10. For this purpose the tube 21 need only be brought through the entire length of the passage 19 and out of the orifice of the tube 19a. The flexible tube 20 would then be provided on the end of the prolonged tube 21.

It will be appreciated that the instant specification and example are set forth by way of illustration and not limitation, and that various modifications and changes may be made without departing from the spirit and scope of the present invention.

What is claimed is:

1. In a device for the control of the vacuum in a vacuum line system and of the type having a casing including a connecting piece connectable to a vacuum line, a main valve disposed in the casing including a main valve chamber which has a valve seat on one side facing the connecting piece, air intake apertures in its outside walls, means forming a control chamber in the casing and to which the vacuum dependant upon the vacuum in the vacuum line is applicable including a first membrane, a main valve body connected by a valve stem to the first membrane and by which the main valve chamber is separated from the control chamber such that the position of the main valve body with respect to the valve seat is dependent upon the vacuum in the control chamber and an auxiliary valve disposed in the casing for influencing the vacuum in the control chamber and including an auxiliary valve body, an auxiliary valve seat, means adjustably biasing the auxiliary valve body into the auxiliary valve seat including a coil spring and an auxiliary membrane joined to the auxiliary valve body and separating first and second auxiliary chambers of which a first is connectable to the vacuum line and a second to the atmosphere for producing a force responsive to the pressure difference to lift the auxiliary valve body from the auxiliary valve seat against the force of the coil spring, the improvement comprising a support movably mounted in the casing having the auxiliary valve disposed therein and movable therewith and on which the stem of the main valve is disposed and which presents active surfaces of different size to the interior of the main valve chamber and to the atmosphere and wherein the means forming the control chamber comprises a second membrane closing off the control chamber on the side facing away from the main valve chamber and adjoining the atmosphere, means joining the first and second membranes to the casing and to the movable support and means forming a main fluid passage connecting the control chamber and the first auxiliary chamber to the vacuum line through the movable support, the main valve stem and the main valve body.

2. The device according to claim 1, further comprising a main tube concentrically disposed in the main passage along at least a portion of its length and passing through the auxiliary valve seat and having an outside diameter smaller than the inside diameter of the main passage and the auxiliary valve seat and wherein the means forming the portion of the main passage connecting the control chamber and the vacuum line comprises a first annular passage between the inside wall of the main passage and the outside wall of the tube and a second annular passage disposed between the tube and the auxiliary valve seat and wherein one end of the main tube is disposed through the auxiliary valve and sealingly and fixedly joined thereto and in communication with the first auxiliary chamber.

3. The device according to claim 1 or claim 2, further comprising a flexible tube connected to the main passage at the end facing the vacuum line and extending into the vacuum line through the connecting piece.

4. The device according to claim 2, wherein the main tube extends through the entire length of the main passage and further comprising a flexible tube connected at the end of the main tube facing the vacuum line and extending into the vacuum line through the connecting piece.

5. The device according to claim 2, further comprising a throttling member connecting the main tube to the first auxiliary chamber.

6. The device according to claim 2, wherein the means connecting the control chamber to the vacuum line comprises a fixed throttle member and further comprising means connecting the control chamber to the second auxiliary chamber via the annular passage upon the lifting of the auxiliary valve body from its valve seat and wherein the main valve body is so disposed with respect to its valve seat that, when the pressure increases in the control chamber, a force acting in the opening direction of the main valve is exerted on it.

7. The device according to claim 6, wherein the fixed throttle member comprises the first annular passage having largest cross-sectional area thereof smaller than the cross-sectional area of the second annular passage.

8. The device according to claim 7, wherein the active surface of the movable support facing the main valve chamber is larger than the active surface facing the atmosphere, the main valve body is disposed on the side of the main valve seat which faces the vacuum line and wherein stem is disposed through the main valve seat.

9. The device according to claim 8, wherein the movable support comprises guide surfaces and wherein the first and second membranes comprise rolling membranes operating against one another which are rollable in opposite directions on the guide surfaces of the movable support.

10. The device according to claim 9, wherein the auxiliary membrane comprises a rolling membrane.

* * * * *